United States Patent

[11] 3,596,314

| [72] | Inventor | Arthur Krugler<br>Whittier, Calif. |
|---|---|---|
| [21] | Appl. No. | 779,154 |
| [22] | Filed | Nov. 26, 1968 |
| [45] | Patented | Aug. 3, 1971 |
| [73] | Assignee | Hitco |

[54] APPARATUS FOR FORMING A DENSIFIED FIBROUS ARTICLE
6 Claims, 4 Drawing Figs.

[52] U.S. Cl. .................................................... 18/5,
18/5P, 18/35, 18/DIG. 60
[51] Int. Cl. ..................................................... B29c 11/00
[50] Field of Search ............................................. 18/5 M, 5 P,
35, 19 F, TM, DIG. 62, DIG. 60

[56] References Cited
UNITED STATES PATENTS
| 2,187,918 | 1/1940 | Sloan ............................ | 18/5 X |
| 3,021,254 | 2/1962 | Helveisen et al. ............. | 162/100 |
| 3,162,895 | 12/1964 | Pusch ........................... | 18/19 |
| 3,170,010 | 2/1965 | Schultz et al. ................ | 18/5 X |
| 3,231,933 | 2/1966 | Benidetto ...................... | 18/5 |
| 3,341,890 | 9/1967 | Oja ............................... | 18/5 |

*Primary Examiner*—J. Howard Flint, Jr.
*Attorney*—Fraser and Bogucki

ABSTRACT: A shaped article is formed from a preformed fibrous felt by densifying the felt between male and female die members, the outer surface of one of the die members being provided with a plurality of restraining edges which prevent the felt from slippage during the densification. As the article is subjected to substantial compression and densification, its ignition characteristics, dimensional stability, water absorption and strength characteristics are significantly improved while structural integrity during the densifying step is maintained.

FIG.—1

PATENTED AUG 3 1971

INVENTOR
ARTHUR H. KRUGLER

APPARATUS FOR FORMING A DENSIFIED FIBROUS ARTICLE

BACKGROUND OF THE INVENTION

The preparation of shaped fibrous articles by various molding techniques is well known. Such articles are commonly prepared from a liquid slurry of the fibers by drawing the fibers onto the surface of a former or shaped felting screen through which a vacuum is pulled. The surface of the former is of the general shape of the desired article and comprises a fine screen or perforated plate which will allow for the passage of liquid but through which the fibers cannot pass. The felting operation consists of submerging the former into the fiber dispersion and thereafter pulling a vacuum on the former so that the liquid is pulled through the openings of the surface of the former while the fibers compact at the surface and conform to its shape. When the preformed felt has reached the desired thickness, the felt and former are removed from the slurry and the vacuum continued until some excess liquid has been removed from the shaped fibrous felt. Thereafter, vacuum is stopped or the flow of air reversed so that the felt is easily removed or blown from the former. The preformed felts may then be molded in order to densify and more perfectly shape the article as well as to remove excess liquid and if impregnated with resin binder to effect its cure.

One technique which has been practiced to densify and shape the preformed felts is commonly referred to as the bag molding technique. This method has found general acceptance because of the manner in which pressure is exerted on the felt during the densification and shaping operation. It will be appreciated that the preformed felt is somewhat delicate in view of its fibrous composition and especially where it contains significant amounts of water or other liquid. Thus, the felt is necessarily quite flexible so that it can be further densified and shaped. In the bag-molding technique, an expandable bag is pressurized with liquid or gas so that it expands against the felt which has been placed in or on a die member. The pressurized bag thereby presses the felt against the die member which often contains a ventilation system extending into a vacuum chamber for further moisture and vapor removal. The disadvantages of the bag-molding technique have been recognized to be slow processing as well as the inability to shape the surface of the felt which contacts the expanding bag to conform to the definite and critical shapes desired. This is evident from the fact that the expanding bag, although exerting significant pressure against the felt, does not itself possess exacting edges and dimensions with which to form the surface of the adjacent felt. Thus, this technique is inferior where critical dimensional and shape requirements must be met especially where the felted article is to be closely fitted with other shaped articles in forming a structural product since the necessary and close structural and shape tolerances cannot easily be obtained. Accordingly, in practice by using such a technique, final hand forming and cutting operations are generally required. Additionally, high-temperature resin curing is not readily accomplished by bag molding since decomposition of the rubber bag occurs at high temperatures with loss of flexiblity and failure of the bag. A further disadvantage is slow heating because of insulative qualities of bag materials.

Another technique is often used and especially where critical and definitely formed shapes having a taper are required is a die-forming technique using smooth surfaced matched metal male and female dies. The preformed felted article is usually placed on the male die member. Either or both the male and female die members may have perforated or slotted surfaces or are composed of screens or perforated metals, which perforations extend into vacuum chambers and through which additional moisture from the felt is removed. The dies may also be heated which, in addition to increasing the rate of felt drying, effects resin cure. As the space between the male and female die members is decreased, the felted article which is present therebetween becomes compressed and densified and its respective surfaces take the shape of the exposed die member surfaces.

Although the latter described technique for forming the felted articles yields products having the desired critical and exact shapes with the technique being carried out in significantly less time as compared to bag-molding techniques, it has not been found to be altogether satisfactory. More specifically, it has been found that, in attempting to improve the densification of the felted product between the generally smooth or otherwise nonrestraining surfaced male and female die members, slippage or movement of the felts occurs. The slippage is due to the nonrestraining surface character of the die members. As the felt is compressed against the surfaces, uneven and uncontrolled felt slippage at both die surfaces causes undesirable irregularities on the adjacent felt surfaces. These irregularities account for uneven fiber distribution and often imperceptible voids as well as tearing of the felt as the die closes. As higher densities are attempted, the amount of slippage increases until a point is reached where all felts tear and acceptable articles cannot be molded. The tearing is practically unavoidable in attempts to compress and densify felts which are deep drawn and have relatively small tapers. Although irregularities other than tears may be tolerated for some products, in others it is quite undesirable and indeed may render the product unsuitable where critical fiber distribution is essential. This problem is especially acute, for example, in the preparation of deep drawn and tapered combustible cartridge cases prepared from felts containing significant amounts of nitrocellulose fibers. As the sides of the preformed felt are compressed against the smooth male die member and extensive compression is exerted by the female die member, the fiber irregularities occur as the surface of the soft, moist felt begins to slip, abrade and tear on the smooth male die surface.

Dimensional and density requirements of articles such as combustible cartridge cases are known to be limited to those of narrow tolerances. More specifically, the nitrocellulose fibers must be essentially evenly distributed throughout the body of the product in order to insure that rapid and complete combustion will occur during firing. The nitrocellulose fibers are necessarily interspersed with a minor amount of stronger although nondetonating fibers and which cartridge case is resin impregnated in order to increase its strength characteristics so that it may be handled and transported with relative safety. In order to prepare a combustible cartridge case which will not leave burning residue in the barrel or chamber after firing, the nitrocellulose fibers must be essentially uniformly displaced throughout the product composition. Yet, relatively small voids or uneven distribution of the critical components results in inferior products which must be rejected.

Attempts to prepare felted products having greatly improved densities by the die-forming technique have not been successful heretofore. Previously, combustible cartridge case components formed by using matched metal male and female die members have achieved densities of only about 40—50 percent of theoretical density with low tensile strengths of about 1,100 p.s.i. Further, such products due to their relatively low density have water absorption characteristics when immersed in water for a few hours of about 80 percent by weight based on the dry fibers. Although it is not contemplated to place the combustible cartridge cases in water prior to use, such test results clearly indicate the affinity of the fibrous compositions toward moisture and accordingly are used as a measure of the potential moisture absorption characteristics of the products when used in field combat conditions. Obviously, the presence of significant amounts of such moisture in the cartridge cases at the time they are to be used for firing is undesirable in that burning characteristics of the material are greatly affected. Other characteristics for which improvement has been sought include improved dimensional stability and more uniform and predictable thermal expansion and contraction. Yet, excepting the use of the slow and time consuming bag-molding techniques described hereinabove which again yield products having less than further desirable shapes and densification such products which accordingly must be further hand formed and cut, attempts to increase the densification of such products have been previously unsuccessful.

SUMMARY OF THE INVENTION

It has now been found that greatly improved felted fiber products are shaped by die-forming techniques utilizing one die member having a fiber restraining surface which contacts the adjacent surface of the felt to prevent slipping during densification. The novel die member may be used to prepare highly densified fibrous felted products having a great variety of compositions both combustible and noncombustible. Such products by virtue of their greatly improved densities exhibit tensile strengths unachievable heretofore by previously known die-forming techniques. In addition, it has been found that these dense fibrous products have unexpectedly low moisture absorption characteristics. Ignition characteristics, combustion rates, and other properties affected by density are also greatly changed and will be more fully described hereinafter. The felted fiber articles may be those which contain resin binders at the time of the molding operation, or, alternatively, the felts may consist of the prefelted articles containing no resin binders, which products may be later resin impregnated or coated and further may be highly densified in a remolding operation.

DETAILED DESCRIPTION OF THE INVENTION

For a better understanding of the present invention, reference will first be made to FIG. 1 in which there is disclosed, by way of specific example, a process relating to the manufacture of combustible cartridge cases. It will be recognized, however, that any shaped fibrous article requiring similar high density, with improved strength, resistance to water pickup, etc., may be formed by similar techniques. With the general case, fibers of the material selected from the group consisting of nitrocellulose, cellulose, synthetic or other fibers and mixtures thereof may be utilized. For high strength combustible cartridge cases, it is generally preferred to employ a major amount of nitrocellulose fibers and a minor amount of combustible or vaporizable nondetonating fibers. Combustible fibers may comprise cellulosic materials or natural or synthetic fibers, for example, acrylic fibers. The use of fibers other than nitrocellulose improve strength characteristics of the product since nitrocellulose fibers are relatively weak. Thus, acrylic (polyacrylonitrile) as well as glass, silica, carbon, graphite, polycarbonate, polyester, polyamide, kraft, rag, and the like, may be used in combination with the nitrocellulose fibers. However, it has been found that, in using a process according to FIG. 1, nitrocellulose may be used exclusively in preparing high-strength cartridge cases due to the high densification achievable. Again, it will be appreciated that a great variety of other highly densified products may be prepared using the aforementioned fibers and combinations thereof, with or without nitrocellulose fibers, including metallic fibers such as aluminum, zinc, magnesium, etc. In the present instance, a mixture of 80 percent nitrocellulose and 20 percent acrylic fibers is given as one specific example for combustible cartridge casings. The fibers were slurried in an aqueous mixture which contained a dispersion of vinyl acetate-methylmethacrylate copolymer resin binder.

Figure 1:
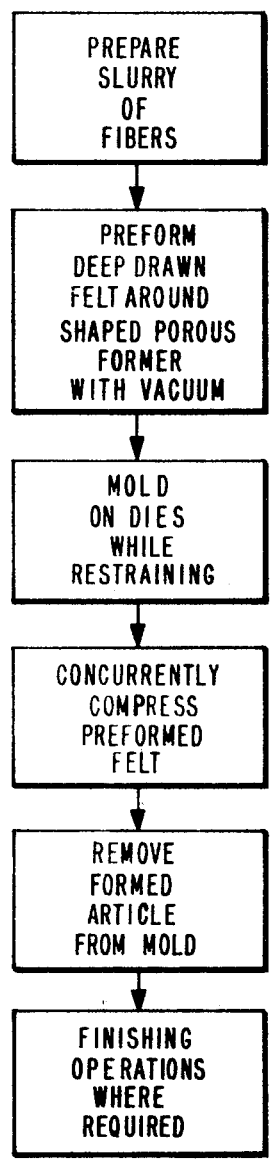
FIG. 1 illustrates schematically the general steps employed in preparing highly densified fibrous products according to the invention.

In accordance with the process of FIG. 1, a slurry having sufficient carrier to maintain the fibers in substantially uniform suspension is employed. Although an aqueous slurry is often preferred, other carriers may be used. Utilizing well-known felting techniques, a preformed felt is provided by the use of a felting member having at least a partially hollow interior and a foraminous surface communicating with the interior. The slurry encompasses this shaped porous former, and a vacuum is drawn in the interior of the former so that fibers are deposited on the former surface and a wall structure is built up on, about or within the former from fiber deposition. In accordance with known practices, the employment of a slurry of a particular fiber concentration enables a preformed felt of desired thickness and characteristics to be built up in a predetermined amount of time about the mold. The amount of fiber deposited may also be controlled by measuring the amount of liquid drawn through the screen or by other suitable methods.

The preformed felt is then withdrawn from the former. It may then be partially dried and otherwise prepared for molding. In the molding step of the process, the preformed felt is compressed between opposed molding surfaces which have the desired final shape and dimensions of the article to be molded. With the deep drawn and slightly tapered part, it is evident that substantially rigid mold surfaces cause differential movement of different portions of the exterior and interior of the fibers of the preformed felt upon compression. Thus, upon compression between nonrestraining die member surfaces, slippage of the felt at the respective surfaces cannot be controlled. The resulting slippage is uneven and not only causes surface tearing out may be transmitted to the interior fibers to cause internal voids and irregularities. In accordance with the invention, however, while the preformed felt is compressed between opposed surfaces, it is restrained from substantial movement on one surface while uniform slippage at the other surface occurs. Yet, continuous surface compression at the slipping surface prevents tears and voids. Concurrently, as compression is increased, the fibers are compressed with uniform relative movement to yield an essentially uniform and homogeneous part. Tears or fractures are avoided since the restrained felt surface does not slip while all slippage occurs at the nonrestraining die surface. Fiber strength is sufficient to overcome or withstand the sliding friction at the nonrestraining surface and tearing does not occur. Yet, it should be understood that should both die members have felt restraining surfaces, although slippage at both surfaces would be avoided, during extensive densification, relative fiber movements between the two restrained surfaces would cause internal tearing such as cracks, voids, etc., especially where deep drawn parts are prepared.

The felt surface restraining means on the mold surface are preferably shaped so that fiber movement is prevented in the direction in which they would tend to or otherwise be displaced during mold closure and compression. Thus, the surface fibers are not only prevented from slippage in the direction of force caused by the compressing die members but the molded article can also be easily removed from the mold. During the molding phase, the preformed felt may also be raised to elevated temperatures such as 260° F. for the combustible cartridge case being discussed as a specific example. During residence at the elevated temperature and densification pressures, volatiles are generated from the densified part and are withdrawn through the structure during this time. Although the use of elevated temperatures is preferred during the molding step and especially if resin binder cure is desired, it may be desirable to remove volatiles solely by vacuum techniques. After the densification step is completed, the part can be withdrawn and subjected to any desired finishing steps, such as coating, surface treatment, appropriate machining and assembly.

Parts in accordance with the apparatus of the present invention have substantial advantages over prior art constructions. In the manufacture of combustible cartridge cases, for example, densities of 45 percent of full theoretical densities are usually achieved employing smooth surfaced or screen matched rigid molds. With the apparatus of the present invention, however, densities of an excess of 80 percent have been achieved, with a number of concomitant major or unique benefits. In contrast to prior art structures, which have tensile strengths of up to about 1,100 p.s.i., tensile strengths of 5,800 p.s.i. have been obtained by employing the apparatus of the invention. At the same time, water absorption has been decreased from approximately 83 percent to approximately 3 percent (based on dry fiber and resin when immersed in water for 4 hours). Such constructions have profound implications for critical parts, such as combustible cartridge cases because thinner constructions may be employed to achieve the same load-bearing strength. Greater uniformity and combustibility is achieved due to the freedom from voids and the extremely low water pickup of the molded article. Different fiber formulations can be used to achieve specific properties which actually yield substantially greater strength than has heretofore been possible. Further, the greater densities yield combustible cartridge cases having significantly increased ignition times. For example, it has been found that the time required to ignite a low density combustible cartridge case prepared by matched die members using previously known techniques has a 20—30 millisecond ignition time as compared to over 4,000 millisecond ignition time for a case having the same fiber and resin composition prepared according to the invention. Obviously, the highly densified cartridge cases offer greatly increased safety factors since the possibility of accidental ignition during handling and storage is significantly decreased. Thinner cartridge walls also will allow for the use of increased amounts of explosive for given external dimensions. Alternatively, for a given amount of explosive, smaller cartridges may be used with concomitant reduction in firing chamber dimensions, etc. The cartridge cases also have more uniform and predictable dimensional stability with temperature variations due to the increased density.

Although the example provided above resulted in the property characteristics noted, other values may be obtained where desired by varying the extent of compression. For example, with the same fiber and resin mixtures, 80 percent of theoretical density yielded tensile strengths averaging about 5,000 p.s.i., 70 percent yielded 3,600 p.s.i., 60 percent yielded 2,600 p.s.i. and 50 percent yielded 1,700 p.s.i. Other variations in fiber and resin makeup may also be selected to achieve the desired characteristics of the product as will be appreciated by those skilled in the art.

Figure 2:
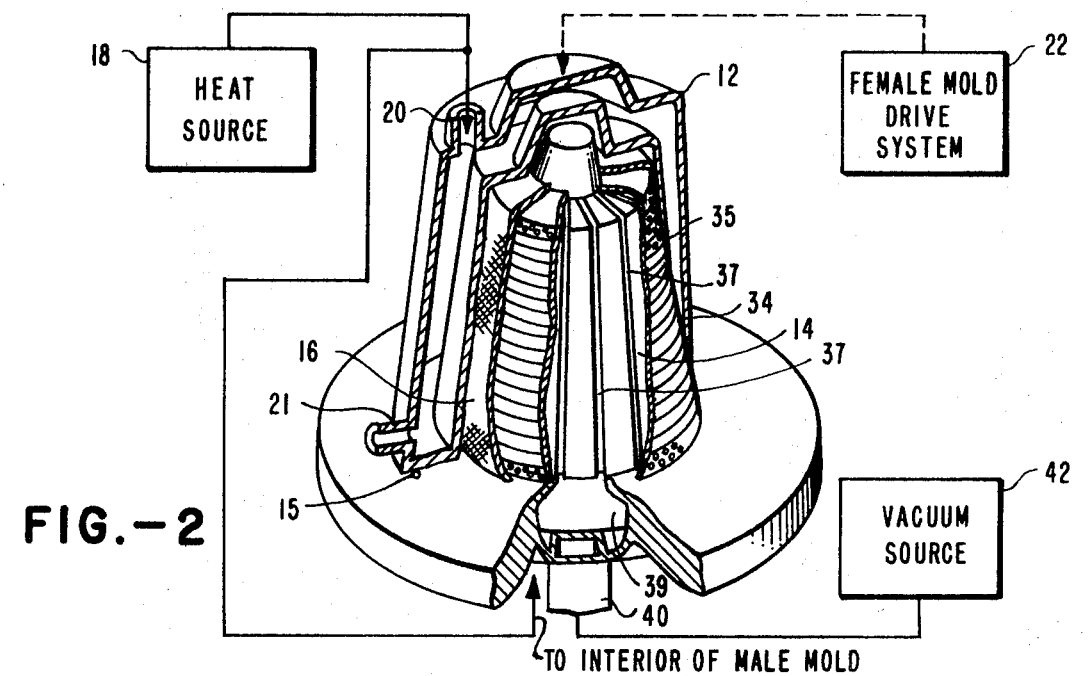
FIG. 2 shows a partially cutaway perspective of engaged female and male die members between which a preformed fibrous felt is compressed and densified.
Figure 4:
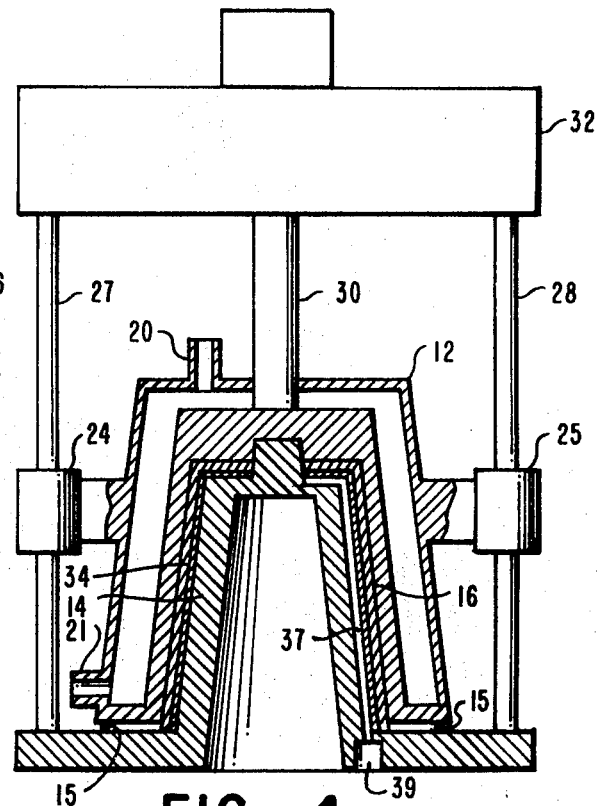
FIG. 4 shows an elevation view in section of the molding apparatus.

A molding machine in accordance with the invention, referring now to FIGS. 2 and 4, includes an outer female mold 12 and an interior male mold 14 disposed about a central longitudinal axis, which is vertical in this instance. A preformed felt 16, here having the general shape of a thin-walled frustum, is disposed between the interior surface of the female mold 12 and exterior surface of the male mold 14. The female mold 12 has a hollow interior into which steam from a source 18 is injected through an inlet conduit 20 and withdrawn from the mold via outlet 21. However, other heating means may be substituted. As best seen in FIG. 4, the female mold 12 moves along the vertical direction from a starting position into a nesting pressurized relationship with the male mold 14.

As best seen in FIG. 4, sliding guides 24, 25 affixed to the exterior of the female mold 12 ride vertically on rods 27, 28 being driven up and down by a piston 30 controlled by a hydraulic drive system 32, details of which have been omitted for simplicity. When in the down position, the female mold 12 is urged or forced by the hydraulic system against stop 15 on the male mold 14. An apertured, relatively thin, sleeve 34 is disposed between the preformed felt 16 and the exterior surface of the male mold 14. Referring again to FIGS. 2 and 4, the sleeve 34 fits snugly about the exterior surface of the male mold 14, and small apertures 35 are disposed about the entire sleeve member 34. These apertures 35 provide communication between the interior surface of the preformed felt 16 and gas conducting grooves 37 formed by longitudinal recesses extending substantially parallel to the central axis and circumferentially spaced about the periphery of the male mold 14. Although the grooves 37 are shown as extending along the vertical axis of the male mold 14, it will be appreciated that they may be circumferential, spiral or in any other configuration.

A channel 39 disposed in the base of the male mold 14 is in communication with the individual grooves 37, and coupled through a header conduit 40 to a vacuum source 42. The steam source 18 is also coupled by a conduit system (illustrated only generally) to the interior of the hollow male mold 14, as best seen in FIG. 4.

In the arrangement as shown in FIG. 2, the female mold 12 is illustrated in a position slightly above the preformed felt 16 before pressure is applied. In the arrangement of FIG. 4, the female mold 12 is shown as in the fully down position. It will be appreciated that, when reciprocated to the up position, there is sufficient clearance for the preformed felt 16 prior to molding, and the densified parts subsequent to molding to be inserted into or extracted from the male mold 14.

Figure 3:
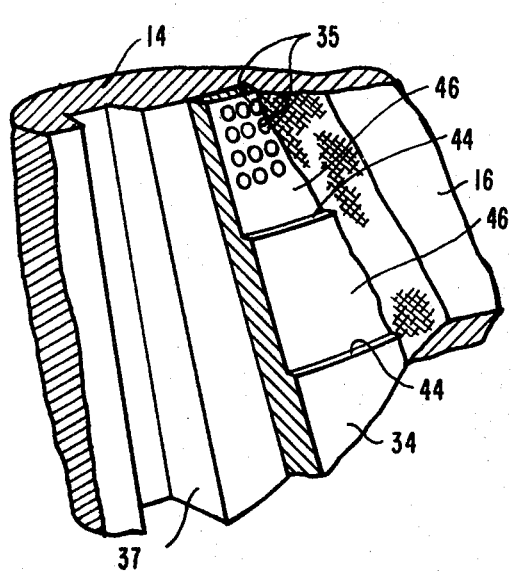
FIG. 3 illustrates an enlarged perspective of a portion of a die member having a felt restraining surface.

In one specific example, the sleeve member 34 has a mold release taper depending upon the desired configuration for the part and also on molding considerations. In this illustration, this taper is approximately 0.077 inch relative to the mold diameter. In accordance with a preferred embodiment of the invention, however, a succession of circumferential steps are disposed on the exterior surface of the sleeve member 34. Each circumferential step, best seen in the detail view of FIG. 3, comprises a relatively small radial discontinuity 44 and a substantially longer longitudinal cylindrical portion 46. The length of these longitudinal portions 46 relative to the vertical dimension of sleeve 34 is short to provide an upward narrowing taper to facilitate release of molded parts after a short displacement of the female member. In the present practical example of the invention, longitudinal surfaces of approximately 0.25 inch and radial steps of approximately 0.008 inch were employed in a mold for making a combustible cartridge casing. However, the concept herein described of restraining felt movement during compression may be accomplished by other surface discontinuities present on a sleeve as shown or directly on the surface of one of the die members. For example, suitable alternative restraining surfaces include restraining edges or flanges, continuous or discontinuous, of any size and/or shape capable of preventing felt surface slippage. The felt restraining surface may be ground, honed, chemically milled or deposited or otherwise formed on the die or sleeve member surface by techniques appreciated by skilled artisans. yet, the felt-restraining surface should be such that the molded part may be removed from the die. Again, the felt-restraining edges present on one die member surface must be such as to prevent felt slippage in the normal direction of fiber displacement upon mold closure and compression.

In the operation of the arrangement shown in FIGS. 2 and 4, a female mold 12 is first raised to its upper limit position by the hydraulic drive system 32 (FIG. 4) and the preformed felt 16 is inserted over the sleeve member 34 about the male mold 14. Concurrently, the female mold 12 and the male mold 14 are heated internally by steam from the source 18. A substantial vacuum is drawn adjacent to the surface of the male mold 14 by virtue of operation of the vacuum source 42 which is in communication with the surface grooves 37. Cycling of the female mold 12 is then begun by downward movement of the mold 12 into engagement with the outer surface of the preformed felt 16 until stop 15 is contacted. Steam is used to heat the interior surface of the female mold 12 and the male mold 14 to temperatures in the range of 260° F. Compression of felt and temperature are maintained for up to 10 minutes, thus densifying the felt and driving off volatiles from the preformed felt 16 while at the same time curing the binder resin to make the molded part. At the conclusion of molding, the female mold 12 is withdrawn upwardly and vacuum is interrupted, following which the molded part 16 may be removed upwardly from the male mold 14. The desired densification, elimination of volatiles, and strength augmentation thus result as previously described.

It will be appreciated that the radial edges 44 provide the necessary longitudinal restraint of limited internal areal segments of the felt 16 during the interval of compression and molding. Consequently, when the interior surface of the female mold 12 moves downwardly against the outer surface of the felt 16 forcing the felt 16 against the sleeve member 34, the radial edges 44 tend to block circumferential ring portions of the interior of the felt 16 from longitudinal movement. While the mechanism is not fully understood, this restraint of areal segments of the felt 16 apparently acts to restrain the entire thickness of the felt 16 from excessive movement, thereby maintaining internal fibrous structural integrity. Further, the restraint of the inner surface appears to prevent cumulative build up of distortion which would otherwise result in tearing of the preformed felt during molding.

It will be evident to those skilled in the art that a number of alternative arrangements may be utilized, including a system in which the male mold 14 is movable and the female mold 12 is held fixed. The relative movement between the parts remains the same. The radial edges 44 which bear against the preformed felt are essentially nonreciprocal in character, i.e. they restrain the felt from movement in the downward direction under pressure, but do not severely restrict movement in the upward direction, thus allowing removal of the article. A number of different expedients may be utilized for this arrangement as previously noted. Further, a woven or nonwoven screen of suitable strength may be employed, and suitable discontinuities may be applied by the addition or installation of rings, by the deposition of material, or by forming particular portions of the outer surface of the sleeve member. Again, it will be appreciated that the restraining surface configuration may be provided on the mold itself by aforementioned techniques and a screen as such would not be used at all. The interior of the mold may be open for the removal of volatiles during molding, and heat may not be applied or is supplied by other means, such as electrical elements and the like.

Fibrous compositions used to prepare felted preformed products which are shaped and densified by the apparatus of the invention will be dependent on the desired nature of the product and the purpose for which it is used. Natural and synthetic cellulosic fibers such as cotton, wool, sulfite, sulfate, ground wood, rag and the like as well as viscose rayon, etc., may be selected. In addition, a great variety of synthetic resin based fibers such as polyacrylonitrile, polyamide (nylon), polyester, and polycarbonate resins, glass silica, carbon and graphite and similar fibers may also be used for certain applications as well as mixtures of the aforementioned materials. The preparation of aqueous dispersions of these fibers is well known in the art and is generally accomplished by cutting the fibers into rather short fiber lengths and dispersing them in an aqueous medium to form a slurry. It may be desirable to add one or more surfactant materials to the aqueous composition in order to improve fiber wetting and mixing by reducing surface tension of the water. Resin binders where desired may be added to the aqueous slurry or the felt may be resin impregnated after molding and prior to a final shaping or densification treatment. Further, products can be prepared by first partially densifying a nonresin containing fibrous felt by a suitable method, resin impregnating the part, and thereafter molding the part according to the invention. The resin binders may be thermoplastic or thermosetting types which will set, solidify or cure when the fibrous felted article is heated in the die members to form a dimensionally stable article which can be easily handled and stored and which, depending on the type of resin binder used, will have improved strength as well as shock resistance, thermal-stability, moisture and chemical resistance, etc. A great number of synthetic or natural resins may be used for this propose including epoxy resins, phenolic resins, polystyrene and copolymers thereof with dienes and/or acrylonitrile, vinyl and vinylidene polymers such as polyvinyl halides and polyvinylidene halides, polyvinyl acetate and copolymers thereof, polyvinyl alcohol, polyvinyl formal, polyurethanes, polyolefins such as polyethylene, polypropylene and the like. The specific polymers which are used will further depend on the desired properties of the final product. However, it will be appreciated, for example, where combustible cartridge cases are to be prepared by this method, those resins which will be effectively consumed in the combustion of the cartridge upon firing must be selected. Such resins are well known to those skilled in the art. Additional materials such as emulsifiers, antifoaming agents, coloring agents, stabilizers, antioxidants, retention aides for improving resin-fiber affinities, and the like may also be added to the slurry composition. Of course, nonaqueous slurries may also be employed.

In preparing combustible cartridge cases, at least a major amount of nitrocellulose fibers will be utilized; and where greater strengths are desired, a minor amount of an additional fiber may be added such as kraft or any of the above-noted synthetic or natural fibers which will be essentially completely consumed or otherwise disposed of upon combustion of the cartridge case. Again, the necessary and desirable characteristics of the fibers and their proportions will be well recognized by those skilled in the art.

I claim:

1. A molding assembly for preparing an extremely high density, shaped fibrous article from a preformed fibrous article comprising in combination:
   a female mold member having a rigid internal configuration corresponding to that desired for the outer surface of the article, said female mold member tapering downwardly;
   means coupled to the female mold member for longitudinally advancing the female mold member along a central longitudinal axis into a molding position adjacent a male mold member;
   a male mold member disposed concentric with the longitudinal central axis and in nesting relation within the concavity of the female mold member, the male mold member having a rigid outer surface configuration generally corresponding to that desired for the inner surface of the article, said male mold member tapering upwardly; and
   one of the mold members having a plurality of fiber restraining surface discontinuities limiting slippage of areal segments of the preformed fibrous article between said rigid female and male mold members when the female mold member is moved into molding position adjacent the male mold member, said discontinuities comprising successive steps tapering in the direction of the narrow end of the mold member on which they are located, the steps including an edge radially disposed relative to the central axis and a relatively long base portion disposed parallel relative to the longitudinal axis.

2. The molding assembly of claim 1 which includes means for heating at least one of the mold members.

3. The molding assembly of claim 1 which additionally comprises vacuum means for drawing a vacuum from the surface of at least one mold member to the interior thereof.

4. The molding assembly of claim 3 wherein the vacuum means comprises a plurality of grooves displaced along the surface of the mold member from whose surface said vacuum is drawn, said grooves being in communication with said vacuum means.

5. A molding assembly of claim 1 in which the surface discontinuities comprise a plurality of circumferential restraining edges successively disposed along the longitudinal axis of the surface of one mold member facing the other mold member.

6. A molding assembly for providing an extremely high density, deep drawn and tapered fibrous article comprising the combination of:
- a female mold member having an internal configuration corresponding to that desired for the outer surface of the deep drawn article;
- means coupled to said female mold member for longitudinally advancing said female mold member along a central longitudinal axis;
- a male mold member disposed concentric with the longitudinal central axis and in-nesting relation within the concavity of said female mold member, said male mold member having a general outer surface configuration corresponding to the interior surface of said article, and further including surface grooves therein extending generally parallel to said longitudinally axis;
- said male mold member tapering upwardly;
- an apertured screen member encompassing and in contact with the exterior of said male mold member, said apertured screen member having a plurality of apertures extending therethrough, and communicating with the grooves in said male mold member, said screen member further including a plurality of circumferential discontinuities successively disposed along the longitudinal axis on the side facing said female mold member, said discontinuities comprising successive steps tapering in the direction of the narrow end of said mold member, said steps including an edge radially disposed relative to the central axis and a relatively long base portion disposed parallel relative to said longitudinal axis;
- means in communication with said grooves for drawing a substantial vacuum within said grooves during closure of said female mold member toward said male mold member; and
- means for heating the mold members.

PO-1050
(5/69)

UNITED STATES PATENT OFFICE
CERTIFICATE OF CORRECTION

Patent No. __3,596,314__                  Dated __August 3, 1971__

Inventor(s) __Arthur Krugler__

It is certified that error appears in the above-identified patent and that said Letters Patent are hereby corrected as shown below:

Column 1, line 64, after "technique" and before "is" insert --which--. Column 3, line 3, "further" should read --the--; line 4, before "which" delete "densification such products". Column 4, line 35, "out" should read --but--. Column 5, line 1, after "Parts" and before "with" delete "in accordance" and substitute --made--. Column 6, line 52, "yet" should read --Yet--. Column 7, line 53, after "glass" and before "silica" insert a comma (--,--). Column 8, line 2, "propose" should read --purpose--. Column 9, line 11, "in-nesting" should read --in nesting--; line 16, "longitudinally" should read --longitudinal--. Column 10, line 9, after "said" (first occurrence) and before "mold" insert --male--.

Signed and sealed this 25th day of April 1972.

(SEAL)
Attest:

EDWARD M. FLETCHER, JR.
Attesting Officer

ROBERT GOTTSCHALK
Commissioner of Patents